United States Patent [19]

Cook

[11] Patent Number: 4,974,986
[45] Date of Patent: Dec. 4, 1990

[54] CONNECTOR FOR VARIABLE-SHAPE SPACEFRAME STRUCTURAL SYSTEM

[76] Inventor: Robert W. Cook, P.O. Box 41144, Tucson, Ariz. 85717

[21] Appl. No.: 399,314

[22] Filed: Aug. 28, 1989

[51] Int. Cl.$^5$ .............................................. F16D 1/00
[52] U.S. Cl. .................... 403/218; 403/171; 403/141
[58] Field of Search ............... 403/217, 218, 171, 176, 403/56, 141

[56] References Cited

U.S. PATENT DOCUMENTS

| | | | |
|---|---|---|---|
| 3,323,820 | 6/1967 | Braccini | 403/218 |
| 4,313,687 | 2/1982 | Apeztegui et al. | 403/171 |
| 4,353,662 | 10/1982 | DuChateau | 403/171 |
| 4,355,918 | 10/1982 | Van Vliet | 403/170 |
| 4,480,418 | 11/1984 | Ventrella | 52/648 |
| 4,606,669 | 8/1986 | DeBliquy | 403/170 |
| 4,624,090 | 11/1986 | Stienen | 52/648 |
| 4,646,504 | 3/1987 | Britvec | 52/648 |

FOREIGN PATENT DOCUMENTS

| | | | |
|---|---|---|---|
| 1392220 | 4/1988 | U.S.S.R. | 403/171 |
| 2075589 | 11/1981 | United Kingdom | 403/56 |

*Primary Examiner*—Andrew V. Kundrat

[57] ABSTRACT

A highly variable and economical spaceframe structual system is provided wherein the ends of elongated frame members have fixedly attached spherical, ball-shaped ends which, in turn, fit into spherically-shaped recessed sockets in the connector joint. The connector comprises three, disk-like parts which nestle one on top of another on a common axis and which are held together with a single bolt fastening means. Each of the three connector parts share interior faces with another part and have matching hemispherical recesses for joining the frame member ends. Other matching recessed formations on the interior faces of these parts permit the frame members to assume variable angles with respect to the common axis and, by this means, faciitate the property of variable curvature of the spaceframe structure. An intermediate assembly nut and a location for its placement is provided in the interior of the connector, the use of which, significantly simplifies the assembly process into three, more manageable stages. The connector parts and frame member ends have simple forms and are economical to cast with simple two-part molds. Differently designed frame member ends are provided which adapt and attach to a wide range of frame member materials. The simple structural design of the three connector parts permits the alternative assembly of a connector for constructing multi-layer spaceframe structures using two sets of two of the connector parts. Alternative frame member ends which are manufactured uusing a flexible, rubber-like material can facilitate the property of a spaceframe structure capable of elastically resonating in response to loading conditions.

15 Claims, 5 Drawing Sheets

CONNECTOR FOR VARIABLE-SHAPE SPACEFRAME STRUCTURAL SYSTEM

FIELD OF THE INVENTION

This invention relates to space structures and, more particularly, to connector and frame elements which, when joined, permit economical construction of a variety of planar and curved spaceframe structures suitable for common building uses.

BACKGROUND OF THE INVENTION

Spaceframe structures have long been known and applied to special architectural and engineering problems. Spaceframes are hyperstatic structures. They have evolved out of the quest to better utilize the tensile properties of materials in order to achieve higher performance load-carrying capacities in structures. These improved structural characteristics are achieved through the high repetition of a basic, triangulated, self-bracing geometry expressed in a three-dimensional truss-like framework.

In general, spaceframes are lighter in weight than conventional structures and permit longer clear spans without additional vertical supports. Typically, spaceframe structures have been planar in shape and most often applied to roofing and flooring systems.

The main focus of spaceframe design innovation is the design of the connecting means; usually a nodal arrangement which joins together the ends of elongated frame members and which provides for the transfer and distribution of loads in the realized structure.

The advantages of spaceframe design, however, have largely been limited to exotic applications. A review of the field reveals that spaceframes have most often been used in exhibition structures, airports, hotels, banks, and shopping malls. This is primarily due to higher costs for the manufacture and field assembly of spaceframe components compared to other structural techniques. To date, spaceframe technology has neither been widely accepted nor successfully applied to common construction practice. Until costs can be reduced, spaceframe systems will find only few applications in residential, commercial, industrial and agricultural buildings.

Contributing to the cost and limited application of spaceframes are two basic types of problems exhibited by previous spaceframe connectors: (A) the connectors are comprised of too many parts, first to be manufactured and later to be simultaneously handled in an assembly procedure; or (B) the connectors require too many assembly steps during field construction. These problems are further compounded by the highly repetitive geometry which demands close manufacturing tolerances of all parts and which contributes to the time-consuming of frame aligning and connector adjustments during assembly.

Another major limitation of previous approaches to spaceframe design is the lack of variability of possible shapes of spaceframe structures. In order for common building practice to more fully benefit from spaceframe technology, a connecting means should be capable of producing a range of space-enclosing shapes such as curved vaults and upright cylinders. Previous spaceframe connectors require geometric or structural modifications in order to be used for curved spaceframe applications. In addition, these connectors require separate manufacture for each change of angular curvature and each change in structural specification.

OBJECT OF THE INVENTION

The object of this invention is to provide a spaceframe connector and a spaceframe, including the connectors, which is capable of producing varying curvatures, not excluding planes, and which can be economically introduced into common construction practice by virtue of its design properties. These properties substantially include: (A) simple structural design; (B) simplicity of manufacture; and (C) simplification of the assembly process in field construction.

SUMMARY OF THE INVENTION

The present invention includes prefabricated elongated frame members with spherical, ball-shaped ends which fit into spherically-shaped recessed sockets in the connector joint. In the preferred embodiment, the connector comprises three parts which nestle one on top of another on a common axis and which are held together with a single bolt fastening means. Each of the three connector parts has at least one interior surface which mates with a corresponding interior surface on another adjacent connector part. Both interior surfaces of each mating pair of interior surfaces have matching, substantially hemispherical recesses which together form substantially spherical sockets for receiving the frame member ends. The substantially spherical sockets adjoin other formations on the interior faces of the connector parts which permit the frame members to assume variable angles with respect to the common axis. In this way, the connector facilitates the property of variable curvature of the spaceframe structure.

All connector parts and frame member ends are simply designed and are without complex formations such as threaded areas. All of these elements are castable in simple two-part molds. Depending on structural requirements, these elements may be manufactured out of a range of materials from metals to structural composites. Accordingly, any appropriate casting method may be used in their manufacture.

Assembly of the spaceframe structure is simplified by the design of the connector. An intermediate assembly nut and a location for its use is provided in the interior of the connector. This intermediate nut permits the assembly process to be simplified into three manageable stages. Through these stages, the connector elements are progressively assembled, in the first two stages, to capture and hold the frame members in place and, in the third stage, to align and fix the spaceframe structure as a whole.

DETAILED DESCRIPTION OF THE INVENTION

Four interrelated aspects of spaceframe design are important to review in order to better understand the present invention:

(A) The essential function of spaceframe connectors is to fix the positions of the ends of frame members such that the resulting rigid framework is capable of distributing loads without critical deformation or collapse of the spaceframe.

(B) The rigidity of spaceframe structures is largely determined by the triangulated, self-bracing geometry of the spaceframe. This means that the three-dimensional triangulation of connected frame members substantially produces the hyperstatic stability and not any angles built into the connectors themselves. Put another way, the connector serves to fix the vertices of the subsequently stable triangles without necessarily fixing the angles of connection.

(C) Angular curvature of spaceframe geometry is produced by the systematic variation of lengths of the frame members. Thus, the variable lengths of the spaceframe members and not the joint connectors by their own means determine the fixed shape of the intended spaceframe structure. In the most common type of spaceframe geometry, a planar structure results when all of the connected frame members are of equal length. Systematic variation of at least one additional length is required to introduce non-planar curvature in the spaceframe structure. Angular curvature is further varied as additional lengths are varied according to a mathematical program.

(D) The systematic variation of frame member lengths, in turn, produces systematic variation of angular positions of members with respect to the axis of the connector joint. Thus, variation of spaceframe curvature may generate different angularly assumed positions of the frame members connected together at the spaceframe joint.

Figure 2:
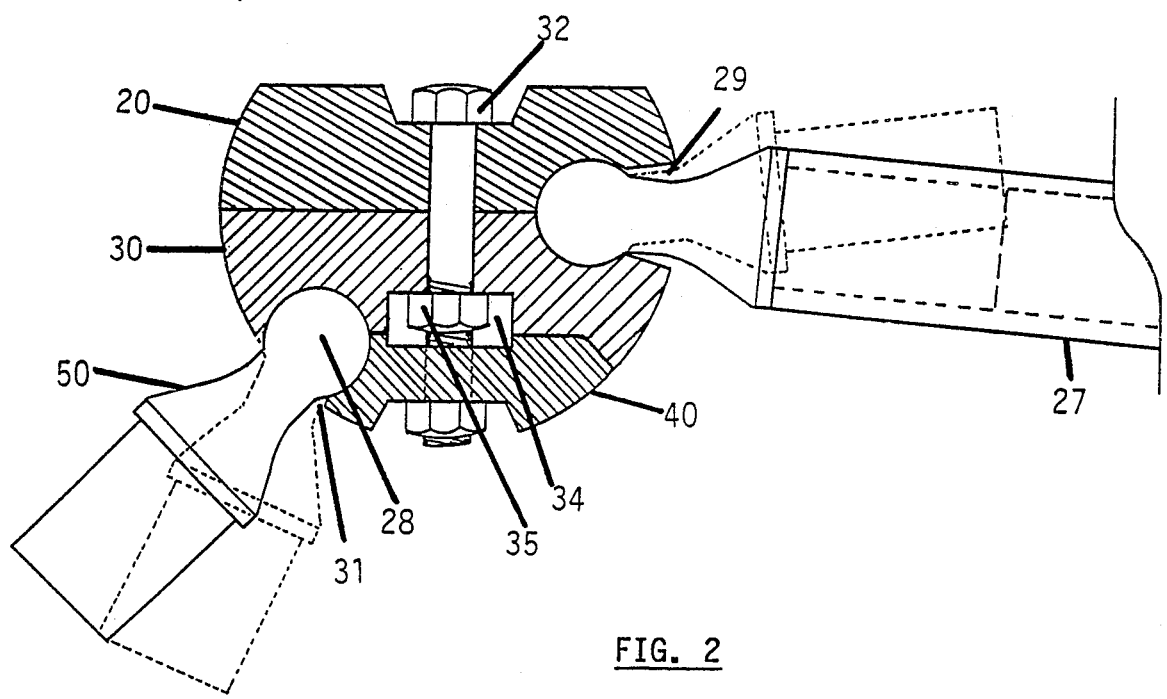
FIG. 2 is a sectional view taken along Section II—II and showing three connector parts holding frame member ends with a single fastening bolt and two nuts.
Figure 3:
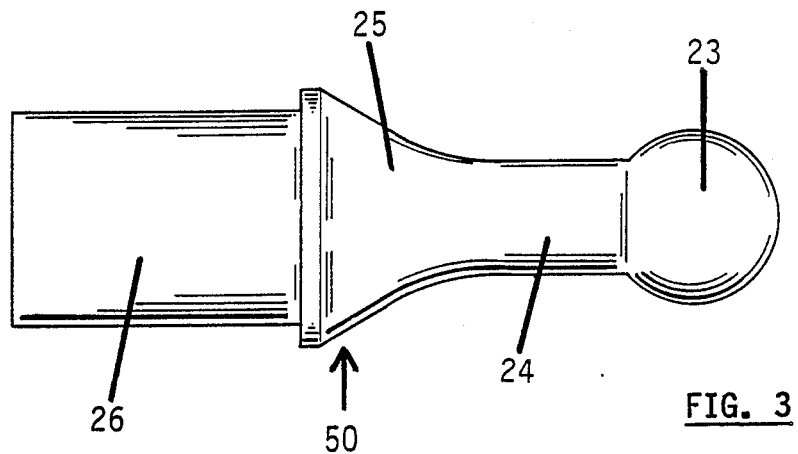
FIG. 3 shows the different portions of a frame member end.

In accordance with the present invention, a minimum plurality of joint connector parts is provided. This minimum plurality may be two, three or four parts depending on the intended configuration of the spaceframe structure. In the preferred embodiment of this invention, three parts (20,30,40) nestle one part on another on a common axis as shown in FIG. 2. The interior face of each part which mates with the interior face of another part includes substantially hemispherical recesses which mate to form substantially spherical sockets for fixing the positions of the frame member ball ends. Each frame member end (50) is comprised of: a substantially spherical ball-like end (23); a substantially cylindrical neck (24); a substantially conical base (25); and an adapting formation (26) for attachment to an elongated frame element as shown in FIG. 3.

According to the object of this invention, a connector is provided which permits a plurality of connected frame members to variably position themselves in order to produce different angularly curved spaceframe structures. The recessed socket formations in the connector may be located at or near the exterior of the connector as shown in (28) or may adjoin other recessed formations (22) which extend outwardly to the exterior surface of the connector. These other recessed formations receive the cylindrically-shaped necks (24) of the member ends. These other recessed formations also may be elongated (29) or enlarged (31) to permit the frame members to assume different angles with respect to the axis of the connector. The substantially spherical shape of the ball and socket fittings in combination with the elongated or enlarged recessed formations for receiving the necks, permit a flexible hinging action of the frame member ends while loosely tightened in the connector assembly. This hinging action is stopped when all self-bracing frame members are also positioned in like manner in the connector assemblies. The diameter of the socket formations and the width of the elongated cylindrical recesses are substantially the same as the respective dimensions of the positive formations of the frame member ball and neck ends. In the preferred embodiment, the positive and negative formations of the connector joint elements fit tight when torque-tightened to predetermined specifications.

In further accordance with the object of this invention, the connector parts and frame member ends are assembled together in a simplied, three-stage sequence. In the preferred embodiment, the fastening means is a single, threaded bolt (32) with two fastening nuts. The shank of the bolt passes through holes (41) provided in the center of each part along the axis of the connector. The simplified three-stage assembly process is made possible by the provision of a recessed cavity (34) large enough for an intermediate assembly nut (35) to be placed and tightened and which is located in matching interior faces of the second and third parts (30,40) as shown in FIG. 2. The intermediate assembly nut permits the previously cumbersome process of positioning together all frame member ends at a node, to be divided into two manageable stages.

Figure 6:
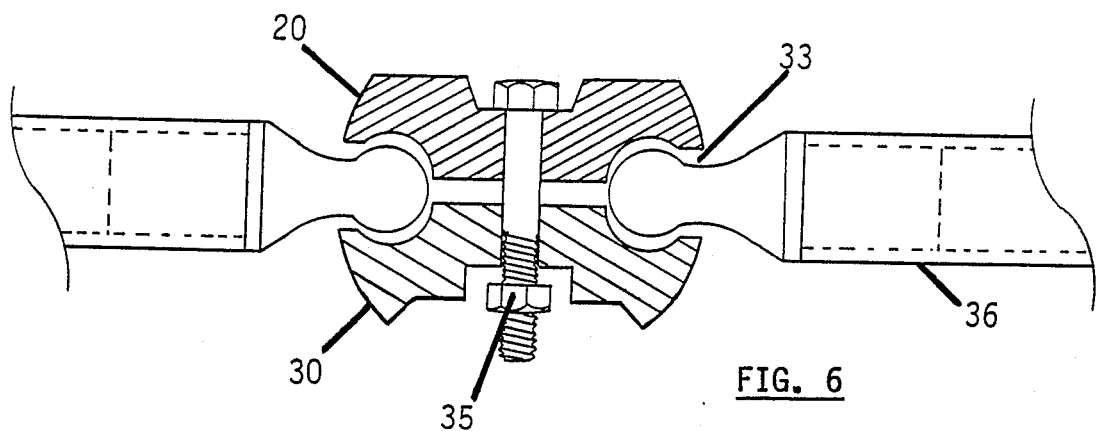
FIG. 6 is a sectional view taken along Section III—III and showing the first stage of the assembly process.

The first stage of the assembly process includes gathering the ball ends of the outer or chordal spaceframe members (36) and locating them in the spherical recesses between the first (20) and second (30) connector parts as shown in FIG. 6. The ball and socket design facilitates the nestling of the elements together (33). The fastening bolt is then placed through holes in the first two connector parts and mated with the intermediate assembly nut (35) and subsequently tightened to a loose fit such that, at minimum, the ball ends cannot escape from the connector assembly. Preferably, the intermediate assembly nut is tightened such that the first and second parts nearly touch each other.

Figure 7:
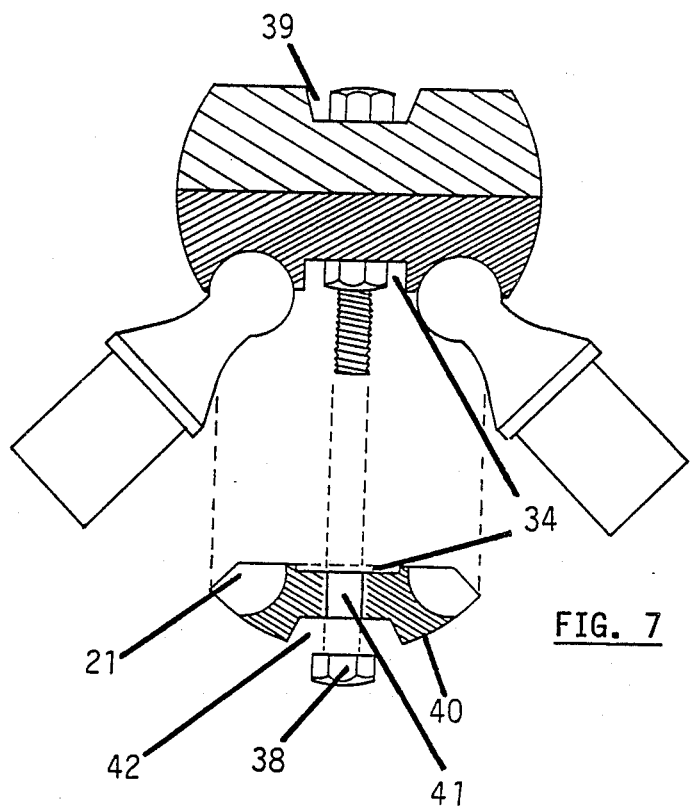
FIG. 7 is a sectional view taken along Section IV—IV and showing the second stage of the assembly process.
Figure 8:
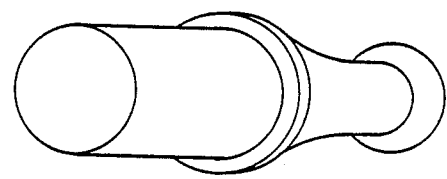
FIG. 8 shows a frame member end suitable for attaching to pipe or tubing stock with a cylindrical adapting portion designed to fit the inside diameter of the frame material.
Figure 9:
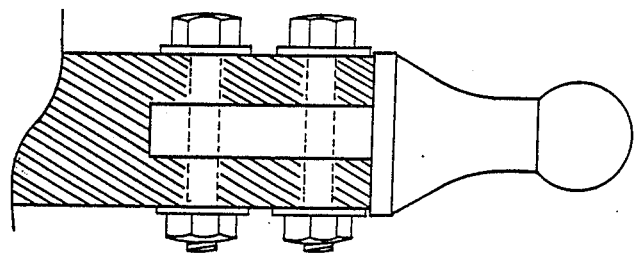
FIG. 9 shows a frame member end designed such that the adapting portion of the member end fits and attaches in a rabbeted end section of a wood frame member.
Figure 10:
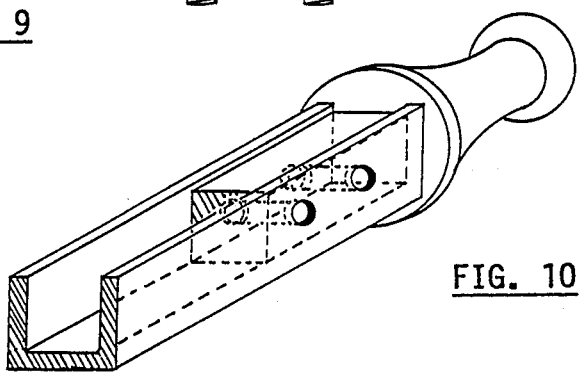
FIG. 10 shows a frame member end designed to attach to channel stock frame materials.
Figure 11:
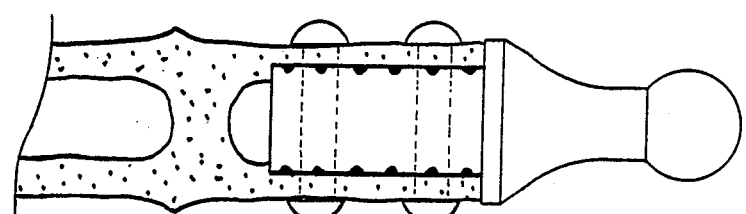
FIG. 11 shows a frame member end designed to fit into the bored end of a bamboo frame member and designed to attach with rivets and circumferential grooves filled with a suitable adhesive.

The second stage involves gathering the ball ends of the inner or web frame members (37) and joining them in like manner to the previous assembly (FIG. 6) with the third connector part (40) and a second nut (38) as shown in FIG. 7. This final fastening nut (38) should also be tightened to a loose fit. These first and second stages are applied in a progressive sequence to each connector assembly in the spaceframe structure.

The third stage of the assembly process includes the torque-tightening of each connector assembly in a pattern of graduated steps. This final stage permits all of the frame member ball ends to self-align in the connector assemblies while the spaceframe structure as a whole is simultaneously aligned and tightened to a specified torque rating with the final fastening nut (38). At this stage, the intermediate assembly nut (35) no longer serves a purpose, yet remains freely residing in the recessed cavity (34). This cavity (34) which accepts the intermediate assembly nut is sufficiently large to permit complete tightening of the connector assembly without the position of the intermediate nut restricting the torque-tightening of the assembly with the final nut (38).

In accordance with one embodiment of this invention, the outer faces of the bolt head and final fastening nut can be located below the exterior surface of the connector after assembly, as shown in FIG. 7. The head of the fastening bolt can rest in a recessed formation, concentric with the axial hole, which opens out (39) on the top of the first connector part. This hollow recess can be cylindrically or conically shaped (39). Similarly, the final fastening nut (38) can rest in a hollow recess (42), concentric with the axial hole on the surface of the third connector part.

Accordingly, the completed connector assembly thus forms a single, solid spaceframe node whereby the spherical ball and socket fittings can provide optimally-shaped surfaces of mutual contact for the rapid resolution of distributed loads. In applications of this invention where additional structural integrity is required, welds or adhesives can be applied to the surfaces of the connector elements to more rigidly secure their relative positions.

Figure 4:
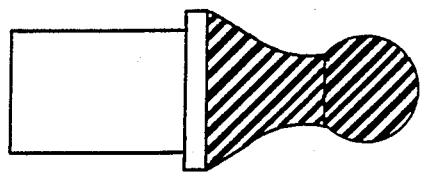
FIG. 4 shows a flexible, rubber-headed frame member end.
Figure 5:
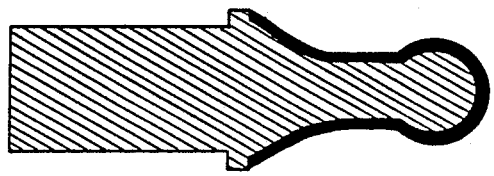
FIG. 5 shows a cross-section of a flexible, rubber-covered frame member end.

Alternatively, a safe structure may be defined as being capable of resonating with external perturbations such as the case with earthquakes. In this type of application, flexible rubber-headed (FIG. 4) or rubber-covered (FIG. 5) frame member ends can be used to optimize structural design. For example, in comparison to vaulted spaceframe structures which distribute loads through a rigidly connected network, vaulted spaceframe structures utilizing connector assemblies with flexible frame member ends can resonate, bounce, or become systematically elastic under various loading conditions and can, under earthquake conditions, outperform spaceframe joints with highly rigid connections.

In another embodiment of this invention, the spherical ball and socket formations can be made to accommodate rotational freedom in the frame elements for specific load-resolving modes of structural response. In this form, the ball and sockets can be engineered to fit close like piston and cylinder and be mutually lubricated to facilitate optimum frame member rotation under loading conditions.

In addition to the aforementioned, other positive and negative formations, not shown in the drawings, can also be located at the interior faces of the connector parts. For example, a pattern of keys and matching grooves can be located on matching interior connector part faces. These keys and grooves help to guide and align the connector elements during assembly and help to resist any twisting tendency of the connector parts under loading conditions.

Figure 1:
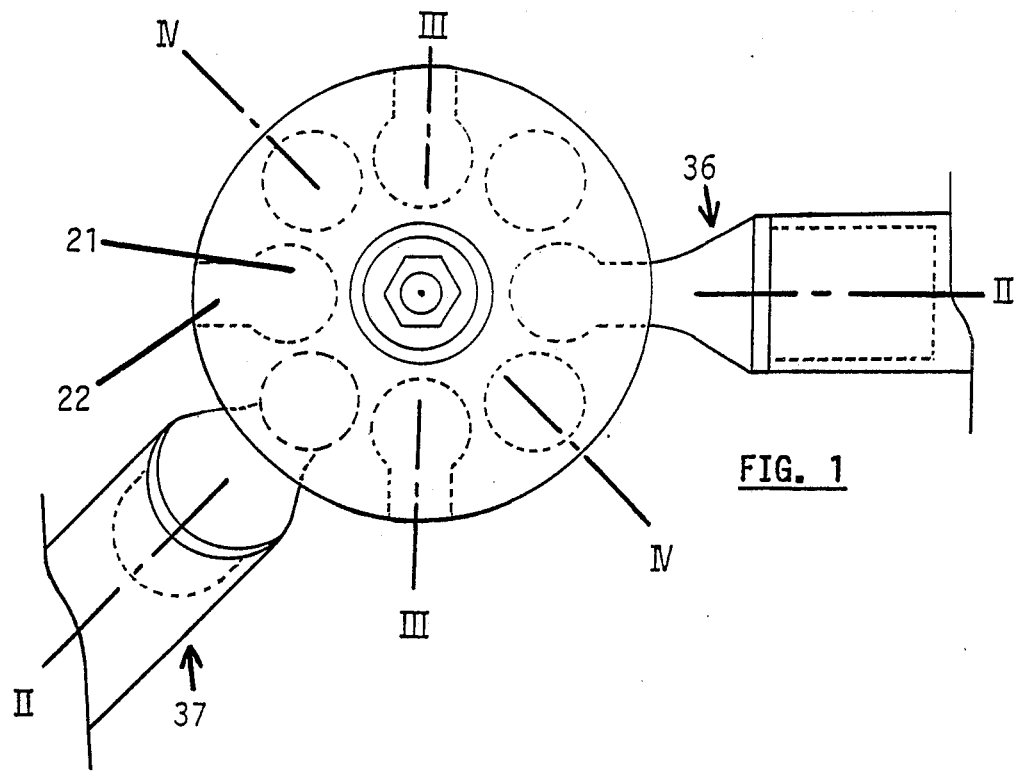
FIG. 1 shows a top view of the connector assembly. Section II—II indicates a cross-section which includes one chord frame member ball and socket and one web frame member ball and socket. Section III—III indicates a cross-section which includes two chord frame member ball and socket sets. Section IV—IV indicates a cross-section which includes two web frame member ball and socket sets.

In spaceframe structures generally, and in vaulted spaceframe structures particularly, engineering experience shows that greater axial loads are exerted on the chordal frame members compared with the loads exerted on the web frame members. Accordingly, in this invention, the location of the socket formations for the chordal frame member ends (36) can be radially closer to the fastening means bolt than the sockets for the web members (37) as shown in FIG. 1. Further, the web member ball ends (37) and their respective spherical recesses can be located in the connector joint such that the cylindrical necks (24) are positioned completely outside of the assembled connector as shown in FIG. 7.

Figure 12:
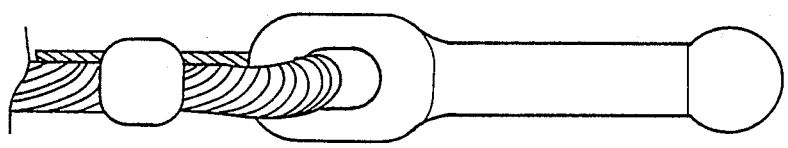
FIG. 12 shows a frame member end designed to accept a cable connection.

In further accordance with the object of the present invention, different frame member ends are provided which adapt to a wide range of materials. A wide selection of appropriate materials for the fabrication of frame members contributes to optimum economy and lower construction costs of spaceframe structures. FIGS. 8, 9, 10, 11, and 12 show different frame member ends designed for different frame member materials: pipe or tubing (FIG. 8); solid wood or structural plywood (FIG. 9); channels or angles, (FIG. 10), bamboo (FIG. 11); and cables (FIG. 12). Depending on both the structural requirements of the intended spaceframe and the materials chosen for use in the manufacture of the spaceframe elements, different attachment means may be used to fix the frame member end (50) to the frame member (27). A suggested list includes: pins, bolts and nuts, rivets, welds, adhesives, friction fittings, and crimped joints.

The highly repetitive geometry of spaceframe structures requires that close tolerances be adhered to in the manufacture of the spaceframe elements. High quality control in both the manufacture of the simple castings and the fabrication of the frame elements of this invention contributes to greater ease of assembly in field construction. In addition, all matching elements to be connected together can be color-coded in order to expedite construction and reduce the necessary skill level for field assembly.

Figure 13:
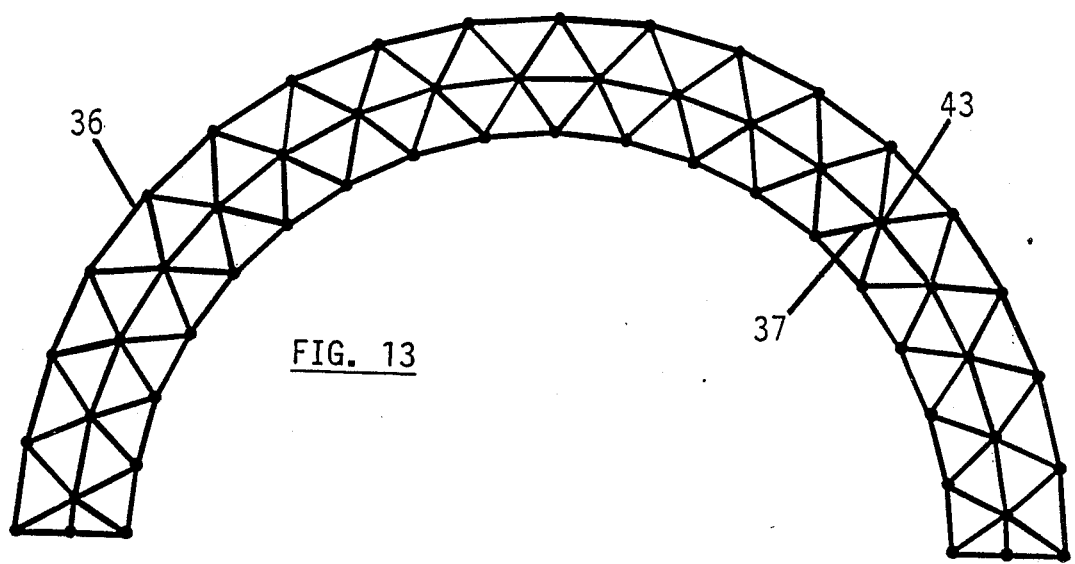
FIG. 13 shows the end view of a double-layer vaulted spaceframe structure.
Figure 14:
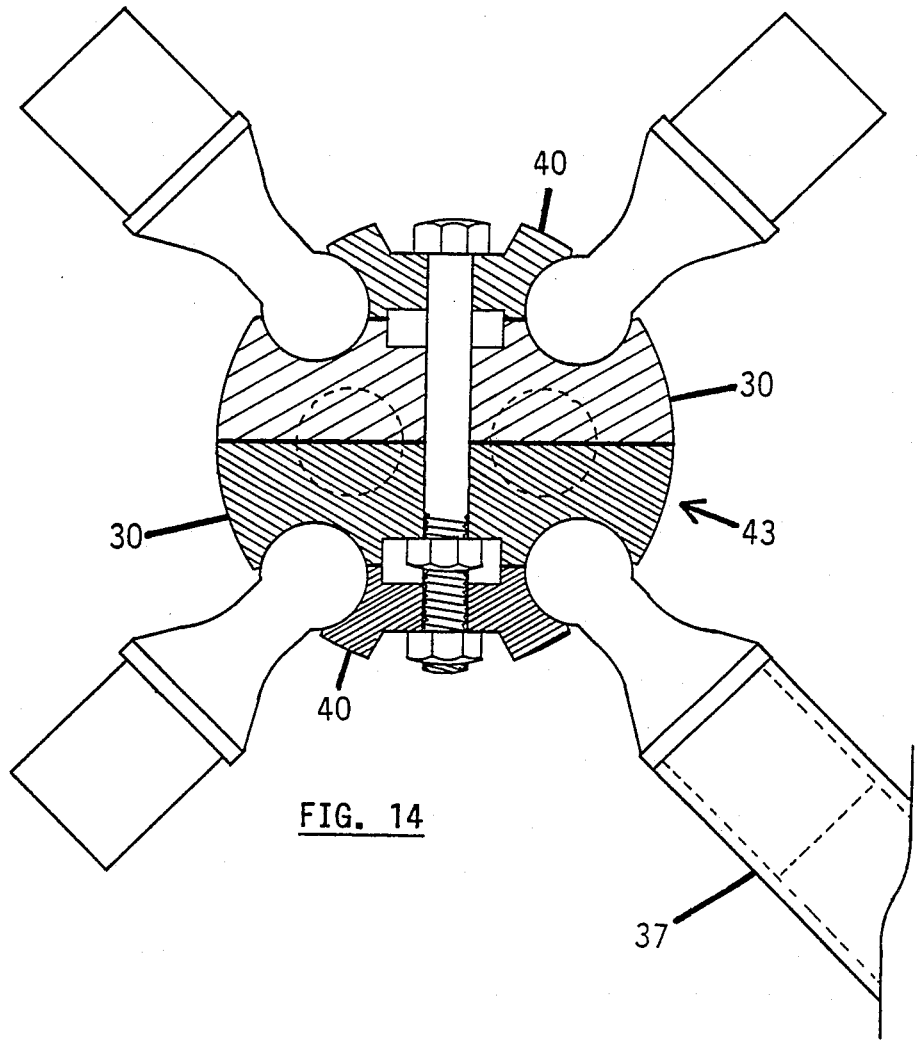
FIG. 14 is a sectional view of a middle connector assembly used in a multi-layer spaceframe structure.

According to the present invention, in cases where significantly increased structural strength is required, additional layers of spaceframe structure can be constructed using the same frame elements and the same connector parts. FIG. 13 illustrates an end view of a double-layer vaulted spaceframe of the present invention. The middle joint connectors (43) connect two sets of web members (one set above and one set below) and one set of chord members making a total of twelve frame elements connected at a single node. This middle connector is comprised of two sets of connector parts (30 and 40) with one set nestling on the other inverted set, as shown in FIG. 14. FIG. 14 also shows that the connector shown in FIG. 2 can be more simply constructed with a combination of two connector parts (30 and 40) by eliminating part 20 and replacing it with a second part 30, invertedly stacked on the first part 30.

Thus, by the foregoing disclosure, the present spaceframe invention demonstrates high flexibility of application and high economy of use by providing a highly structural, simply designed, economical to manufacture and assemble spaceframe structural system. By incorporating the features described herein, this invention discloses a spaceframe connector and spaceframe including the connectors which is capable of wide-ranging applications in common building construction. The drawings and embodiments of this present invention are illustrative and should not be construed to limit the full range of possible variations which fall within the scope of the invention.

I claim:

1. A spaceframe structural system comprising: a plurality of elongated frame members having substantially spherical, ball-shaped frame member ends; a connector assembly having substantially spherical sockets for receiving said frame member ends, said connector assembly comprising first, second and third disk-like parts which are stacked one on the other on a common axis, each of said parts having a central hole therethrough, a sigle bolt fastening means extending through said holes for securing said parts together, said parts having interior faces each which mate with and abut against the interior face of another part, said mating faces having a plurality of matching, substantially hemispherical recesses which together form said sockets for joining said frame member ends, said parts having other matched recessed formations adjoining said sockets and which extend to the exterior of said connector assembly, said other recessed formations including means which permit said frame members to assume variable angles with respect to said axis, said mating interior faces of said second and third parts defining a cavity concentric with said axis and through which said bolt extends, an intermediate assembly nut threaded on said bolt and located in said cavity, said intermediate assembly nut holding together one set of frame member ends between said first and second parts, a final fastening nut threaded on said bolt and bearing against the outer surface of said third part so that another set of frame member ends is held between said second and third parts.

2. A system of claim 1, wherein said ball-shaped frame member ends are separate elements and have an adapting portion for rigid attachment to said elongated frame members, said frame members being tubular, said adapting portion being cylindrically-shaped and having a diameter substantially equal to the inside diameter of said tubular frame member material and which is fixed to said frame member.

3. The system of claim 1, in which said frame members are wooden and have a rabbeted end slot and wherein said ball-shaped frame member ends are separate elements and each have an adapting and attaching portion, said portion having a bar-section shape and an attachment means and being dimensionally formed to fit the rabbeted end slot in said wood frame member.

4. The system of claim 1, in which said frame members are channel-shaped in cross-section and wherein said ball-shaped frame member ends are separate elements and each have an adapting and attaching portion, said portion having a key-section shape and an attachment means and being dimensionally formed to fit the inside of the channel of said frame member material.

5. The system of claim 1, in which said frame members are bamboo and have bored-out end sections and wherein said ball-shaped frame member ends are separate elements and each have an adapting and attaching portion, said portion being cylindrically-shaped and having a diameter substantially equal to the diameter of said bored-out end section of said bamboo frame member, said cylindrical portion having a circumferential pattern of grooves which provide recesses and surfaces and an adhesive attachment means disposed in said grooves.

6. The system of claim 1, in which said frame members are bamboo and have bored-out end sections and wherein said ball-shaped frame member ends are separate elements and each have an adapting and attaching portion, said portion being cylindrically-shaped and having a diameter substantially equal to the diameter of said bored-out end section of said bamboo frame member, said cylindrical portion having an attachment means to fixedly connect said bamboo frame member to said frame member end.

7. The system of claim 1, in which said frame members comprise cables and wherein said ball-shaped frame member ends are separate elements and each have an adapting and attaching portion, said portion having a loop shape suitable for attaching said cable frame members.

8. The system of claim 1, wherein said ball-shaped frame member ends comprise a ball-like end, a substantially cylindrical neck adjoining said end, a substantially conical base adjoining said neck, and an adapting formation adjoining said base and adapted for attachment to an elongated frame member.

9. The system of claim 1, wherein said connector assembly comprises first and second sets of said second and third parts, said second set replacing said first part, and which is invertedly stacked on said first set of said second and third parts on said axis, providing sockets which receive a third set of frame member ends, said bolt and nuts securing together all four parts of said connector assembly, said connector assembly permitting construction of multi-layer spaceframe structures.

10. The system of claim 1, wherein said frame member ends comprise a flexible, rubber-like material so that a stable, yet less rigid, spaceframe structure is produced and whereby the property of an elastic, resonating response to loading conditions in said structure is facilitated.

11. The system of claim 1, wherein said frame member ball ends and said matching sockets fit close and have highly friction-resistant mutual surfaces which permit said frame members to have a rotational freedom of action inside said connector assembly during loading conditions of said spaceframe structure.

12. A spaceframe connector comprising a plurality of parts which are stacked one on the other on a common axis, said parts having interior faces each of which mates and abuts against the interior face of another part, said mating faces having a plurality of matching, substantially hemispherical recesses, which together form substantially spherical sockets for joining the ball-shaped ends of elongated frame members, said parts having other matched recessed formations adjoining said sockets and which extend to the exterior of said connector, said other recessed formations substantially including circumferentially enlarged recesses which permit the axes of said frame members to vary with respect to each other and to said common axis and, by this means, permit multi-planar angular freedom in the hinging action of said elongated frame members, and fastening means extending parallel to said axis and securing said parts together.

13. The connector of claim 12, wherein said connector comprises a first, second and third part, said fastening means is a single bolt and two nuts and wherein said interior faces of said second and third parts have a recessed cavity concentric with said axis, an intermediate assembly nut disposed in said cavity and threaded on said bolt, said intermediate assembly nut being adapted for holding together during the assembly process one set of frame member ends disposed in the sockets between said first and second parts, a final fastening nut threaded on said bolt and bearing against the outer surface of said third part so that another set of frame member ends can be held between said second and third parts, said final fastening nut being tightened on said bolt clamping together said first, second and third parts.

14. The connector of claim 13, wherein said connector comprises first and second sets of said second and third parts, said second set replacing said first part, and which is invertedly stacked on said first set of said second and third parts on said axis, providing sockets which receive a third set of frame member ends, said bolt and nuts securing together all four parts of the connector assembly, said connector assembly permitting construction of multi-layer spaceframe structures.

15. In a spaceframe connector of the type comprising first, second and third parts which are stacked one on the other on a common axis and wherein said parts have matching recessed formations on their mutual interior faces for joining the headed ends of elongated structural frame members, said parts having central holes, the improvement which comprises: said parts are held together with a single bolt, an intermediate assembly nut and a final fastening nut, said nuts being threaded on said bolt ,said bolt extending through said holes and parallel to said axis and wherein said mutual interior faces of said second and third parts have a recessed cavity concentric with said axis, said intermediate assembly nut being disposed in said cavity and being adapted for holding together one set of frame member ends between said first and second parts during the assembly process, said final fastening nut bearing against the outer surface of said third part so that another set of frame member ends can be held between said second and third parts said final fastening nut being tightened on said bolt clamping together said first, second and third parts after completed assembly of said connector and after final alignment of said frame members.

* * * * *